United States Patent
Godowski et al.

(10) Patent No.: US 10,733,289 B2
(45) Date of Patent: Aug. 4, 2020

(54) IDENTIFICATION OF SOFTWARE COMPONENTS BASED ON FILTERING OF CORRESPONDING EVENTS

(71) Applicant: INTERNATIONAL BUSINESS MACHINES CORPORATION, Armonk, NY (US)

(72) Inventors: Piotr Godowski, Cracow (PL); Grzegorz Majka, Cracow (PL); Artur Obrzut, Cracow (PL); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/694,780

(22) Filed: Sep. 2, 2017

(65) Prior Publication Data
US 2018/0365418 A1 Dec. 20, 2018

(30) Foreign Application Priority Data

Jun. 20, 2017 (GB) .................................. 1709812.0

(51) Int. Cl.
*G06F 21/55* (2013.01)
*G06F 21/56* (2013.01)
*G06F 21/53* (2013.01)

(52) U.S. Cl.
CPC ............ *G06F 21/552* (2013.01); *G06F 21/53* (2013.01); *G06F 21/564* (2013.01); *G06F 2221/033* (2013.01)

(58) Field of Classification Search
CPC ...... G06F 21/552; G06F 21/564; G06F 21/53; G06F 2221/033
See application file for complete search history.

(56) References Cited

U.S. PATENT DOCUMENTS 7,523,493 B2 * 4/2009 Liang ...................... G06F 21/56
713/188
7,620,992 B2 * 11/2009 Monastyrsky ........ G06F 21/566
726/22

(Continued)

OTHER PUBLICATIONS

Valvano et al., Chapter 12: Interrupts, "Embedded Systems—Shape the World", [retrieved on Sep. 24, 2018], Retrieved from the Internet: <URL: https://web.archive.org/web/20131202093550/http://users.ece.utexas.edu:80/-valvano/Volume1/E-Book/C12_1nterrupts.htm>, (Year: 2013), 20 pages.

(Continued)

*Primary Examiner* — Kambiz Zand
*Assistant Examiner* — Mirza Israr Javed
(74) *Attorney, Agent, or Firm* — Dmitry Paskalov (57) ABSTRACT

A solution is proposed for identifying software components in a computing system. A corresponding method comprises monitoring events relating to one or more software components of the computing system, filtering the events into filtered events according to finalizing events of corresponding event sequences ending with the finalizing events, each of the event sequences relating to a logical operation for a corresponding current software component of the software components being finalized by the finalizing events, and determining corresponding current signatures of the current software components of the filtered events, each of the current signatures being determined according to at least part of a content of the corresponding current software component for use to identify the current software component according to a comparison of the current signature with one or more known signatures of known software components.

19 Claims, 7 Drawing Sheets

(56) References Cited

U.S. PATENT DOCUMENTS

| | | | | |
|---|---|---|---|---|
| 7,818,801 | B2* | 10/2010 | Small | G06F 11/3476 707/672 |
| 8,122,122 | B1* | 2/2012 | Clingenpeel | G06F 21/552 709/203 |
| 8,590,045 | B2* | 11/2013 | Niemela | G06F 21/566 726/24 |
| 9,146,928 | B1 | 9/2015 | Noveck | |
| 9,218,278 | B2 | 12/2015 | Talagala et al. | |
| 9,516,053 | B1 | 12/2016 | Muddu et al. | |
| 2002/0032754 | A1 | 3/2002 | Logston et al. | |
| 2006/0101282 | A1* | 5/2006 | Costea | G06F 21/56 713/188 |
| 2009/0044024 | A1 | 2/2009 | Oberheide et al. | |
| 2010/0180344 | A1* | 7/2010 | Malyshev | G06F 21/566 726/23 |
| 2010/0211950 | A1 | 8/2010 | Kusko et al. | |
| 2011/0083180 | A1 | 4/2011 | Mashevsky et al. | |
| 2011/0191850 | A1 | 8/2011 | Turbin | |
| 2013/0055392 | A1 | 2/2013 | Small | |
| 2015/0347440 | A1 | 12/2015 | Habouzit et al. | |
| 2016/0042024 | A1 | 2/2016 | Campanotti et al. | |
| 2017/0032117 | A1 | 2/2017 | Koohgoli et al. | |

OTHER PUBLICATIONS

IBM, "List of IBM Patents or Patent Applications Treated as Related (Appendix P)," Sep. 28, 2017, p. 1-2.

U.S. Appl. No. 15/694,782, entitled "Identification of Software Components With Event Persistency Across Operation Interruptions", filed Sep. 2, 2017, pp. 1-42.

Pending GB application GB1709812.0, filed Jun. 20, 2017, entitled: "Identification of Software Components Based on Filtering of Corresponding Events", pp. 1-34.

Pending GB application GB1709813.8, filed Jun. 20, 2017, entitled: "Identification of Software Components With Event Persistency Across Operation Interruptions", pp. 1-38.

\* cited by examiner

IDENTIFICATION OF SOFTWARE COMPONENTS BASED ON FILTERING OF CORRESPONDING EVENTS

BACKGROUND

The present disclosure relates to the information technology field. More specifically, this disclosure relates to the identification of software components in computing systems.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The identification of software components in computing systems, or simply computers, is a commonplace activity in several applications.

A typical example is the identification of malwares that might perform malicious operations on the computers (for example, viruses, warms, trojan horses). This is important for ensuring security of the computers, especially when they are routinely used to access external networks (like the Internet).

For this purpose, anti-malwares (such as anti-viruses) are commonly used to protect the computers from malwares; the anti-malwares are aimed at preventing the installation of malwares, detecting activities performed by them and removing their threads. Particularly, the anti-malware of each computer may provide real-time protection by monitoring the computer for suspicious activities relating to loading of software components therein, including their deployment, opening or execution; whenever the anti-malware detects these activities, it neutralizes the corresponding malwares, for example, by preventing their installation, deleting them or moving them to a quarantine area (wherein the malwares are no longer capable of damaging the computer). In this case, the anti-malware operates at a kernel level of an operating system of the computer (with a permission of a corresponding user) to implement the required functionalities. Moreover, the anti-malware may be used to scan (for example, periodically) the computer to detect and neutralize as above any malwares that are found.

Generally, the anti-malwares identify the malwares according to corresponding signatures defined by their (cryptographic) hash values, or simply hashes. Particularly, each anti-malware has a signature database (being continually updated for new malwares) that stores the hashes of all the known malwares. During the real-time monitoring or the periodic scanning of the corresponding computer, the anti-malware calculates the hash of each software component currently under analysis; the software component is identified as a malware whenever a match of its hash is found in the signature database.

However, the calculation of the hashes of the software components is relatively complex from a computation point of view. Therefore, the verification of the software components involves an overhead of the computers that may adversely affect their performance, especially when the verification is performed in real-time.

Moreover, several organizations (such as private or public companies) have policies that prevent the use of (unauthorized) software programs on their computers; typically, these unauthorized software programs are unrelated to an activity of the organization (such as games, social networks) or do not comply with applicable license conditions (such as for private use only). For this purpose, a management agent running on each computer monitors any software program that is deployed thereon (for example, downloaded from the Internet). The monitoring agent verifies the software program against a blacklist (or block list) of the unauthorized software programs; whenever a match of the software program is found in the blacklist, the monitoring agent denies its installation on the computer. For this purpose, the monitoring agent uses corresponding signatures of the (unauthorized) software programs to identify them, for example, defined by their names and sizes. However, the identification of the software components by their names/sizes is relatively weak; this adversely affects the accuracy of the monitoring agent.

US-A-2009/0044024 discloses a technique for detecting, analyzing and quarantining unwanted files in a network environment, wherein a host agent residing on a computing device in the network environment detects a new file introduced to the computing device and sends the new file to a network service for analysis; corresponding file usage information collected by the host agent may be filtered out for unimportant events (for example, by collecting information about the launching of applications only so that events about access to non-applications are not sent to the network service).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of filtering the events relating to each software component.

Particularly, an aspect provides a method for identifying software components in a computing system, wherein events relating to one or more software components of the computing system are filtered (according to finalizing events of one or more corresponding event sequences) and signatures of the software components of the filtered events are determined according to at least part of a content thereof.

A further aspect provides a corresponding computer program for implementing the method.

A further aspect provides a corresponding computer program product for implementing the method.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies *mutatis mutandis* to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation).

DETAILED DESCRIPTION

With reference in particular to FIG. 1A-FIG. 1D, the general principles are shown of the solution according to an embodiment of the present disclosure.

Figure 1A:
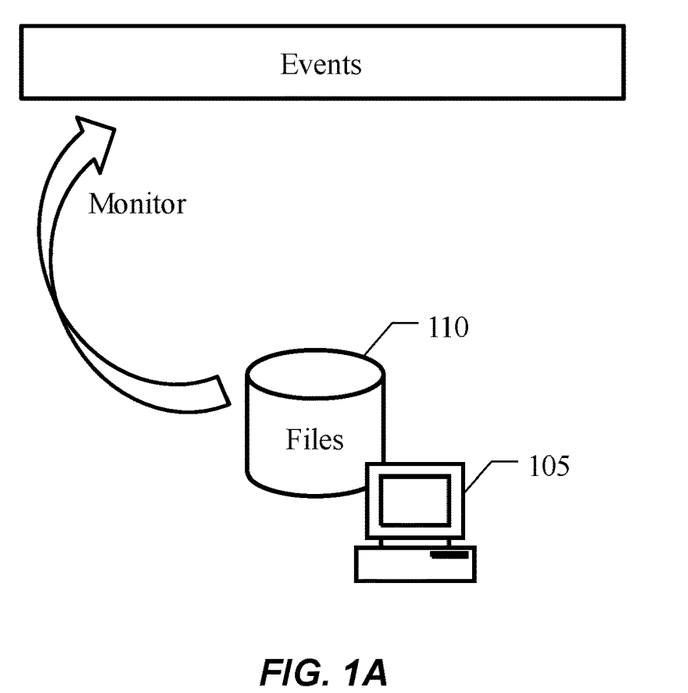
FIG. 1A-FIG. 1D show the general principles of the solution, according to an embodiment of the present disclosure.

Starting from the FIG. 1A, events are monitored on a computing system, for example, each of multiple endpoints (or targets) 105 of a resource management application (not shown in the figure). The events relate to software components, for example, files 110 of the endpoint 105; typically, the events indicate that the files 110 are created, opened, modified, renamed, deleted, closed, and so on. For example, the events may be monitored by listening for corresponding notifications that are generated by an operating system of the endpoint 105 (not shown in the figure).

Figure 1B:
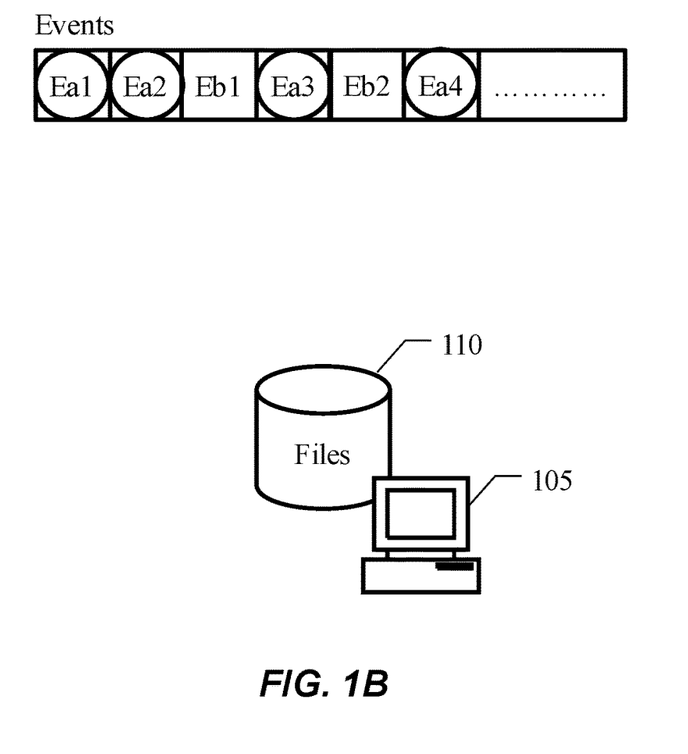

Moving to FIG. 1B, event sequences are identified within the events that are monitored. Each event sequence is composed by one or more events that relate to a logical operation of a corresponding (current) file 110. The logical operation indicates an operation at a high level, which is perceived by a user of the endpoint 105; the corresponding events instead indicate actions that have been performed on the file at a low level to implement the logical operation (by the operating system of the endpoint 105). For example, the logical operation is a modify operation for copying a file 110 to the endpoint 105; the modify operation is implemented by actions for creating the file 110 empty or with a minimum size, writing one or more blocks thereof and then closing the file 110, as indicated by a corresponding event sequence denoted in the figure with corresponding events Ea1, Ea2, Ea3 and Ea4 (mixed with other events Eb1 and Eb2 for other files 110). Each event sequence ends with a finalizing event, which indicates the corresponding action that finalizes the logical operation (so as to make its completion manifest to the user). With reference to the above-mentioned example, the finalizing event Ea4 indicates the closing of the file 110 after its whole content has been copied to the endpoint 105.

Figure 1C:
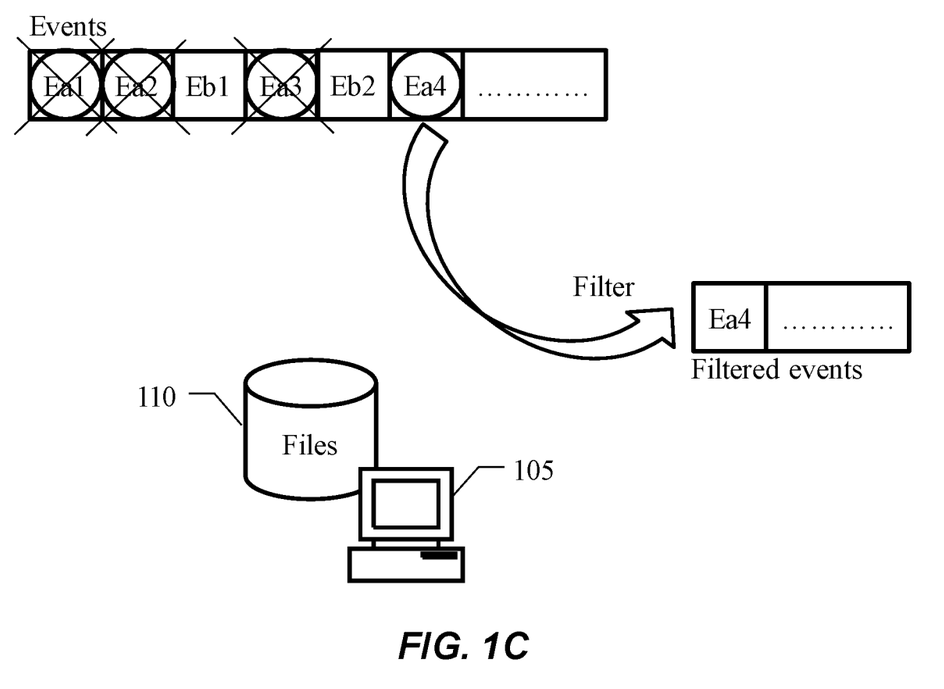

Moving to FIG. 1C, the events are filtered (into corresponding filtered events) according to the finalizing events. For example, for each event sequence only its finalizing event is maintained, whereas all the other events are discarded. In the example at issue, the events Ea1, Ea2, Ea3 and Ea4 are filtered into the (single) event Ea4, which indicates that the copying of the corresponding file 110 to the endpoint 105 has been completed.

Figure 1D:
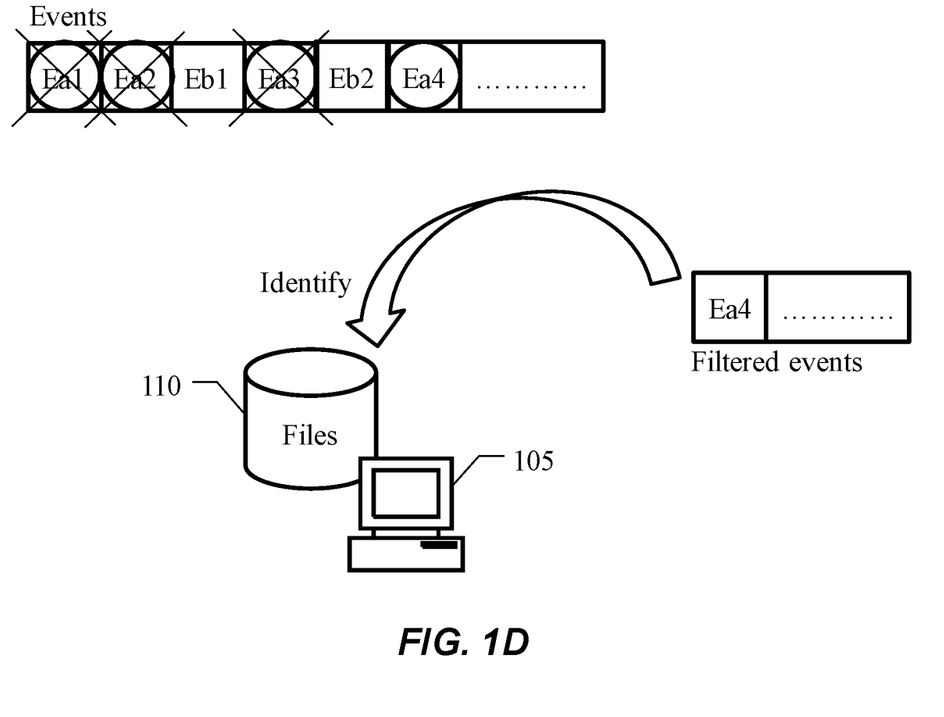

Moving to FIG. 1D, a signature of the file 110 corresponding to each filtered event is determined in response thereto; the signature is determined according to a content of the file 110 (or at least a part thereof), for example, by calculating its hash (value). Therefore, in the example at issue the hash of the file 110 corresponding to all the events Ea1, Ea2, Ea3 and Ea4 is calculated for the finalizing event Ea4 only, and then on the file 110 as completely copied to the endpoint 105. The hashes of the files 110 so determined may then be used for identifying them according to a comparison with known signatures of known software components, i.e., known hashes of known files in this case.

The information so obtained may be used for a number of purposes. For example, the identification of the files 110 in all the endpoints 105 is used in the resource management application. Particularly, this information may be used for inventory purposes to track the (legitimate) software programs that are installed on the endpoints 105 (for example, for ensuring compliance with applicable license conditions). The same information may be used to discover any unauthorized software programs that are installed on the endpoints (for example, software programs unrelated to an activity of a corresponding organization or that do not comply with applicable license conditions), as indicated in a corresponding blacklist. The same information may be used to detect any malwares that are present on the endpoints 105, so as to intervene promptly to neutralize them (for example, by deleting the malwares or moving them to a quarantine area).

The above-described solution allows obtaining high accuracy in the identification of the files 110 at the same time with low overhead of the endpoint 105; indeed, despite the fact that a very high number of events relating to the files 110 of the endpoint 105 are generated during its regular operation (for example, of the order of thousands per second), the hashes of the files 110 are calculated only when it is actually necessary; this avoids wasting computing resources for calculating the hashes of the same files 110 when they are not significant (for example, repeatedly during the writing of a file 110 while it is copied to the endpoint 105).

As a result, the monitoring of the endpoint 105 has a reduced impact on its performance. Therefore, the regular operation of the endpoint 105 is substantially unaffected; this is especially advantageous when the endpoint 105 is monitored in real-time, so that its monitoring is nearly transparent to the corresponding user.

The solution is of general applicability; particularly, as mentioned above this provides a comprehensive solution for inventorying legitimate software programs, discovering unauthorized software programs and detecting malwares at the same time.

Figure 2:
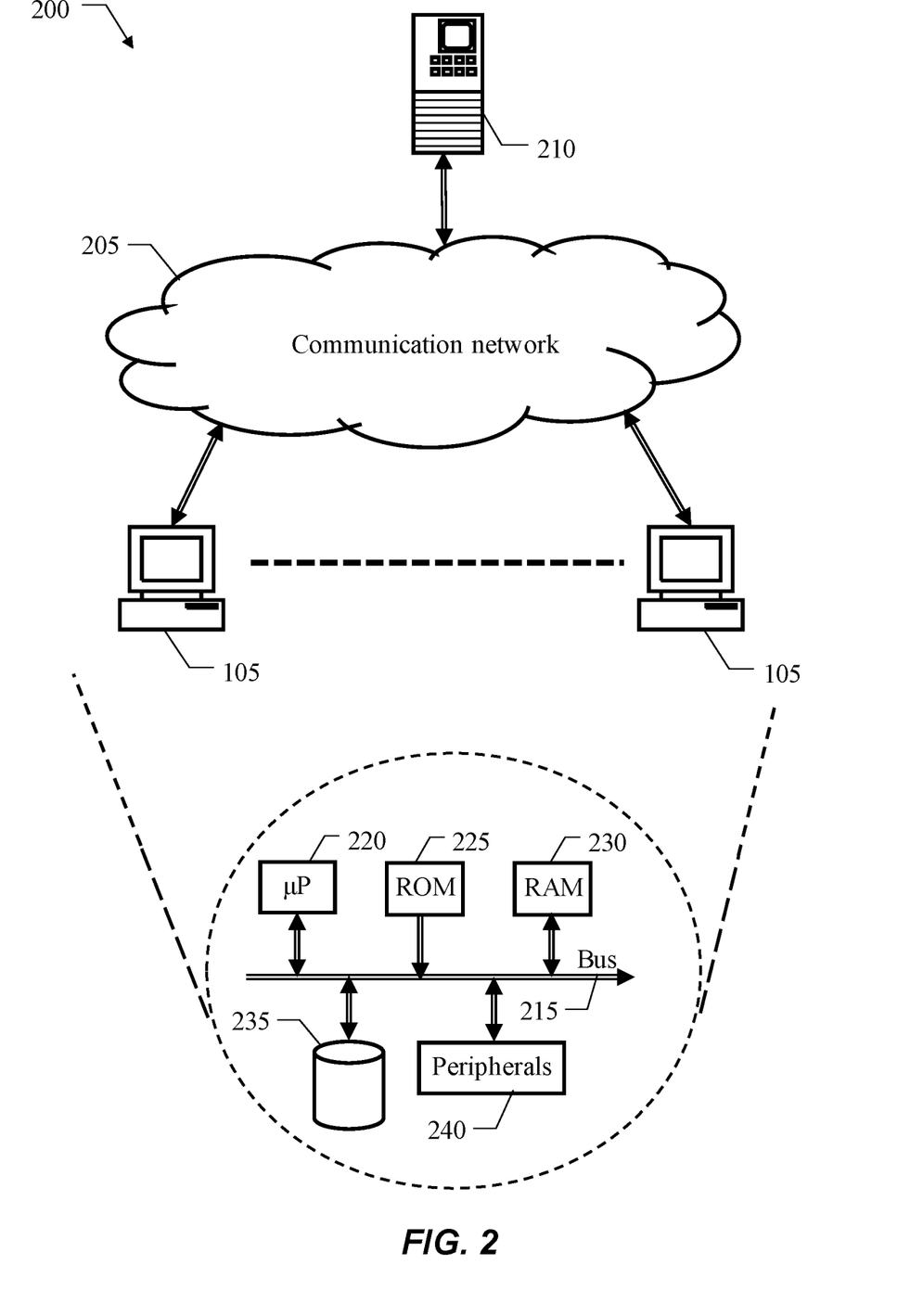
FIG. 2 shows a schematic block diagram of a computing infrastructure wherein the solution, according to an embodiment of the present disclosure, may be applied.

With reference now to FIG. 2, a schematic block diagram is shown of a computing infrastructure wherein the solution according to an embodiment of the present disclosure may be applied.

The computing infrastructure 200 is used to run a resource management application. The computing infrastructure 200 has a distributed architecture based on a communication network 205 (for example, the Internet). Several computing systems are connected to the communication network 205 for communicating among them (for example, through a corresponding Virtual Private Network, or VPN). Particularly, these computing systems comprise multiple endpoints 105 and a management server 210 (or more) of the resource management application; the management server 210 controls the management of the endpoints 105 (for example, for inventorying legitimate software programs, discovering unauthorized software programs and detecting malwares of the endpoints 105 and then causing the execution of desired management activities thereon, such as by applying corresponding management policies).

Each of the computing systems 105,210 comprises several units that are connected among them through a bus architecture 215 (with one or more levels). Particularly, one or more microprocessors (μP) 220 control operation of the computing system 105,210; a non-volatile memory (ROM) 225 stores basic code for a bootstrap of the computing system 105,210 and a volatile memory (RAM) 230 is used as a working memory by the microprocessors 220. The computing system 105,210 is provided with a mass-memory 235 for storing programs and data; for example, the mass-memory 235 of the endpoints 105 may comprise solid-state disks, whereas the mass-memory 235 of the management server 210 may comprise storage devices of a data center wherein the management server 210 is implemented. Moreover, the computing system 105,210 comprises a number of controllers for peripheral (or Input/Output, I/O) units 240; for example, the peripheral units 240 of the endpoints 105 may comprise a monitor, a keyboard, a mouse, a drive for reading/writing removable storage units (like DVDs) and a wireless network adapter for accessing the communication network 205, whereas the peripheral units 240 of the management server 210 may comprise a network adapter for plugging it into the data center and a similar drive for reading/writing removable storage units implemented by a console of the data center.

Figure 3:
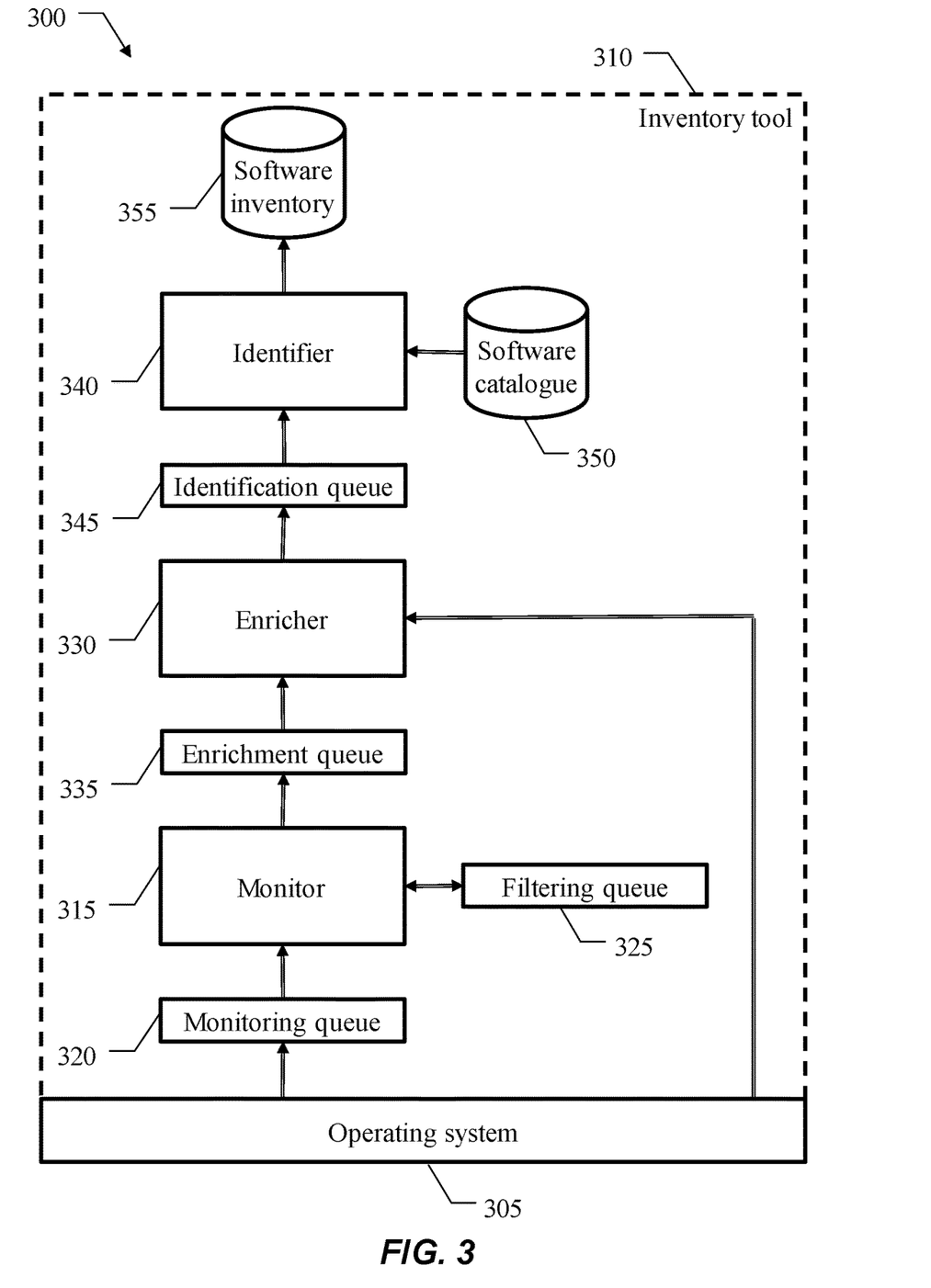
FIG. 3 shows the main software components that may be used to implement the solution, according to an embodiment of the present disclosure.

With reference now to FIG. 3, the main software components are shown that may be used to implement the solution according to an embodiment of the present disclosure.

All the software components (programs and data) are denoted as a whole with the reference 300. The software components 300 are typically stored in the mass memory and loaded (at least partially) into the working memory of each endpoint (only one shown in the figure) when the programs are running, together with other application programs (not shown in the figure). The programs are initially installed into the mass memory, for example, from removable storage units or from the communication network. In this respect, each program may be a module, segment or portion of code, which comprises one or more executable instructions for implementing the specified logical function.

Particularly, the endpoint has an operating system 305, on top of which an inventory tool 310 runs. The inventory tool 310 identifies the files that are present on the endpoint for use by a server-side component of the resource management application running on the management server (not shown in the figure); commercial examples of the inventory tool 310 and of the resource management application are IBM Common Inventory Technology (CIT) and IBM BigFix, respectively, by IBM Corporation (trademarks).

The inventory tool 310 comprises the following elements. A monitoring module, or simply monitor, 315 is used to monitor and filter the events (relating to the files of the endpoint). For this purpose, the monitor 315 is registered as a listener for notifications of these events, or simply events, with the operating system 305; for example, each event comprises a timestamp, a name and a path of the corresponding file and an indication of a type of the event (for example, create, open, modify, rename, delete, close). The operating system 305 and the monitor 315 share a monitoring queue 320 implemented by a FIFO register capable of storing a fixed number of events; the operating system 305 acts as a producer of the monitoring queue 320 (generating and adding the events to its tail), whereas the monitor 315 acts as a consumer of the monitoring queue 320 (extracting the events from its head). The monitor 315 further accesses (in read/write mode) a filtering queue 325 (implemented by a FIFO register capable of storing a fixed number of events), which is used to store the events temporarily for their filtering (as described in the following).

An enrichment module, or simply enricher, 330 is used to enrich the (filtered) events with additional information for the identification of the corresponding files. For this purpose, the monitor 315 and the enricher 330 share an enrichment queue 335 (implemented by a FIFO register capable of storing a fixed number of filtered events); the monitor 315 acts as a producer of the enrichment queue 335 (adding the filtered events to its tail), whereas the enricher 330 acts as a consumer of the enrichment queue 335 (removing the filtered events from its head). For each filtered event, the enricher 330 adds one or more signatures thereof and a size of the corresponding file (retrieved from the operating system 305). For example, each signature is a hash of the file (which maps a content of the file, or a portion thereof, to a string of a fixed number of bits), and particularly a cryptographic hash (which is infeasible to invert to the corresponding content of the file and unlikely to be the same for different files); for example, the cryptographic hash may be calculated with the SHA-256 and MD5 cryptographic hash functions.

An identification module, or simply identifier, 340 is used to identify the files corresponding to the filtered events so enriched, or simply enriched events (according to their hashes). For this purpose, the enricher 330 and the identifier 340 share an identification queue 345 (implemented by a FIFO register capable of storing a fixed number of enriched events); the enricher 330 acts as a producer of the identification queue 345 (adding the enriched events to its tail), whereas the identifier 340 acts as a consumer of the identification queue 345 (removing the enriched events from its head). Moreover, the identifier 340 accesses (in read mode) a software catalogue 350, for example, downloaded from the management server that maintains it up-to-date. The software catalogue 350 specifies all the known files that are to be identified according to the specific application; for example, when the inventory tool 310 is used for inventorying legitimate software programs the software catalogue 350 is a whitelist thereof (for example, maintained by a system administrator to specify the software programs that are authorized in the corresponding organization), when the inventory tool 310 is used for discovering unauthorized software programs the software catalogue 350 is a blacklist thereof (for example, maintained by the system administrator to specify the software programs that are not authorized in the corresponding organization) and/or when the inventory tool 310 is used for detecting malwares the software catalogue 350 is a signature database thereof (for example, publicly available in the Internet to specify the malwares to be neutralized). For each known file, the software catalogue 350 indicates an identifier and a (known) signature thereof. The identifier (substantially uniquely) identifies the known file for use by humans (for example, its product name and version). The signature (substantially uniquely) represents a content of the known file for use by the identifier 340; for example, the signature comprises the hash of the known file and the corresponding type (for example, SHA-2, MD5). The hash may be based on the whole content of the known file or on a portion thereof. For example, the hash may be based on one or more common segments of different known files of a same family, like mutations of a same malware (for example, by masking the differing segments of the known files of the family with wildcard characters). The identifier 340 accesses (in write mode) a software inventory 355, which identifies the files of the endpoint; particularly, for each file of the endpoint the software inventory 355 indicates its identifier (when the file has been identified) and in any case its name, path and size.

The inventory tool 310 operates in user mode, i.e., with privileges reduced with respect to a maximum level thereof (in kernel mode); this significantly reduces any security exposure of the endpoint. Nevertheless, the risk of overflow of the monitoring queue 320 (with consequent killing of the inventory tool 310) is limited. Indeed, the monitor 315 listening for the events with the operating system 305 is very simple (since the most computationally complex operations required to calculate the hashes are performed by the enricher 330); therefore, by assigning a relatively high priority to the monitor 315, it is possible to ensure that, in most practical situations, the monitor 315 is capable of consuming the events in the monitoring queue 320 avoiding that its overflow (with the enricher 330 that instead may be assigned a relatively low priority to reduce the overhead of the endpoint 105, since the filtered events are significantly reduced and no stringent time constraint applies in this case).

Figure 4A:
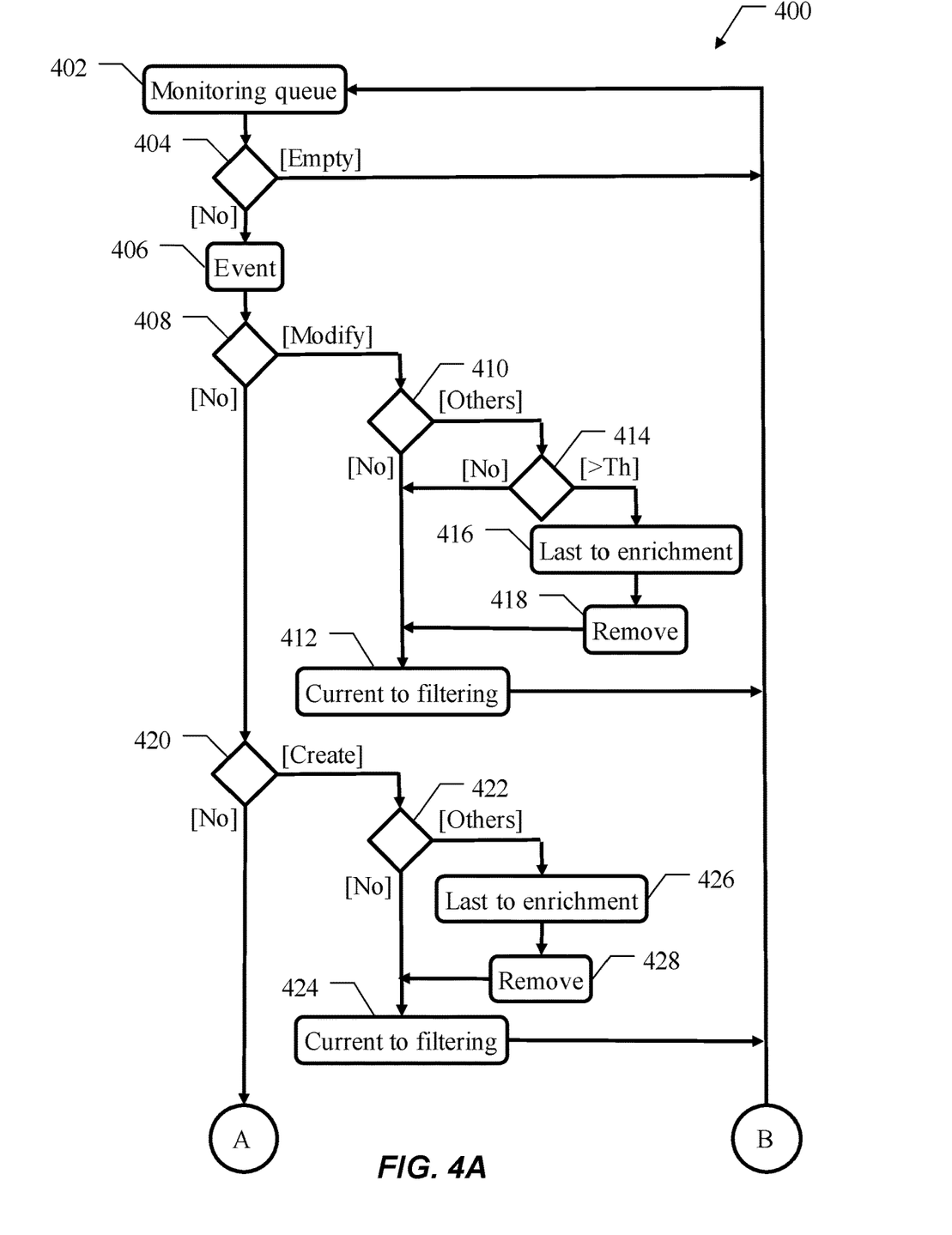
FIG. 4A-FIG. 4C show an activity diagram describing the flow of activities relating to an implementation of the solution according to an embodiment of the present disclosure.
Figure 4B:
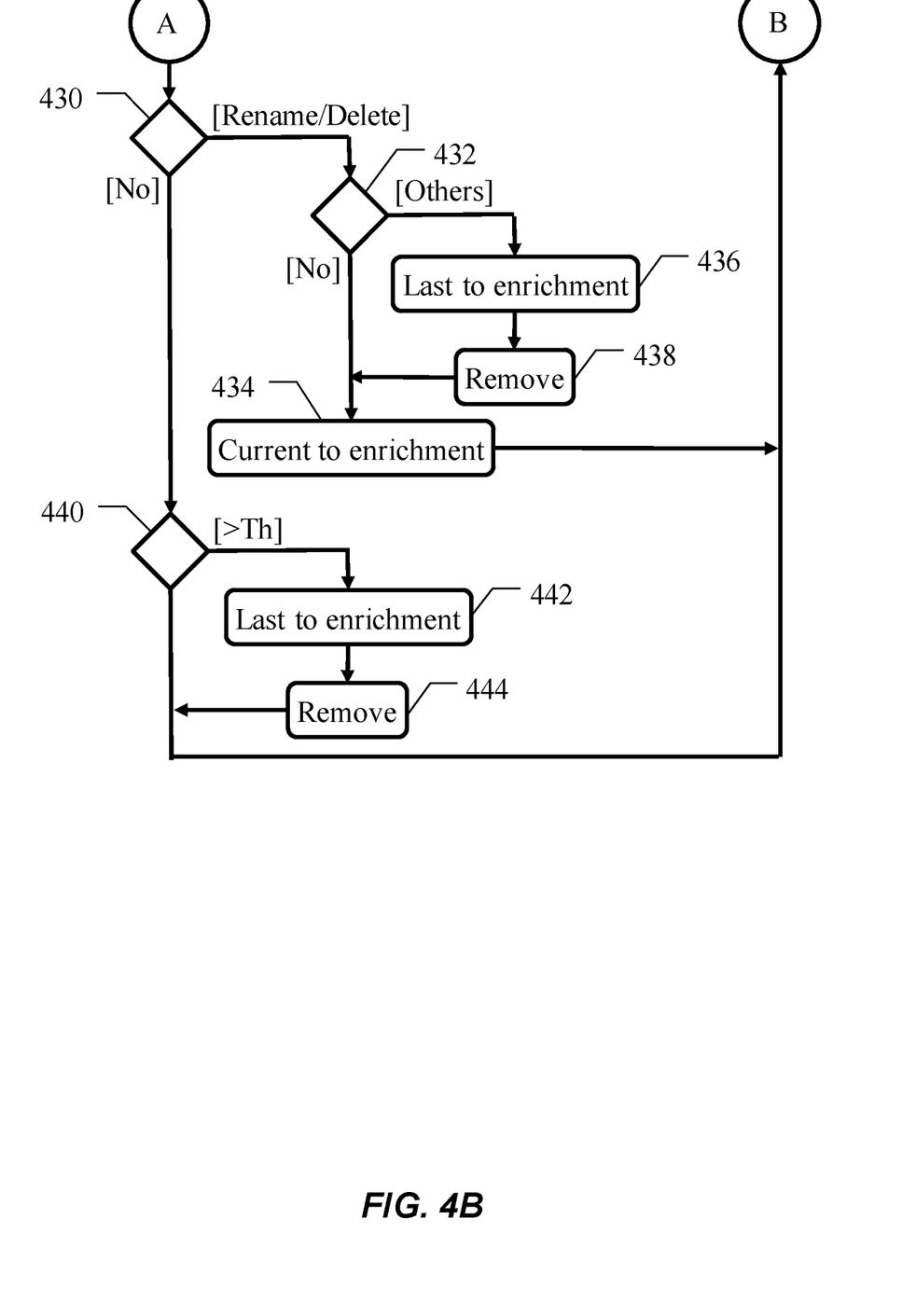
Figure 4C:
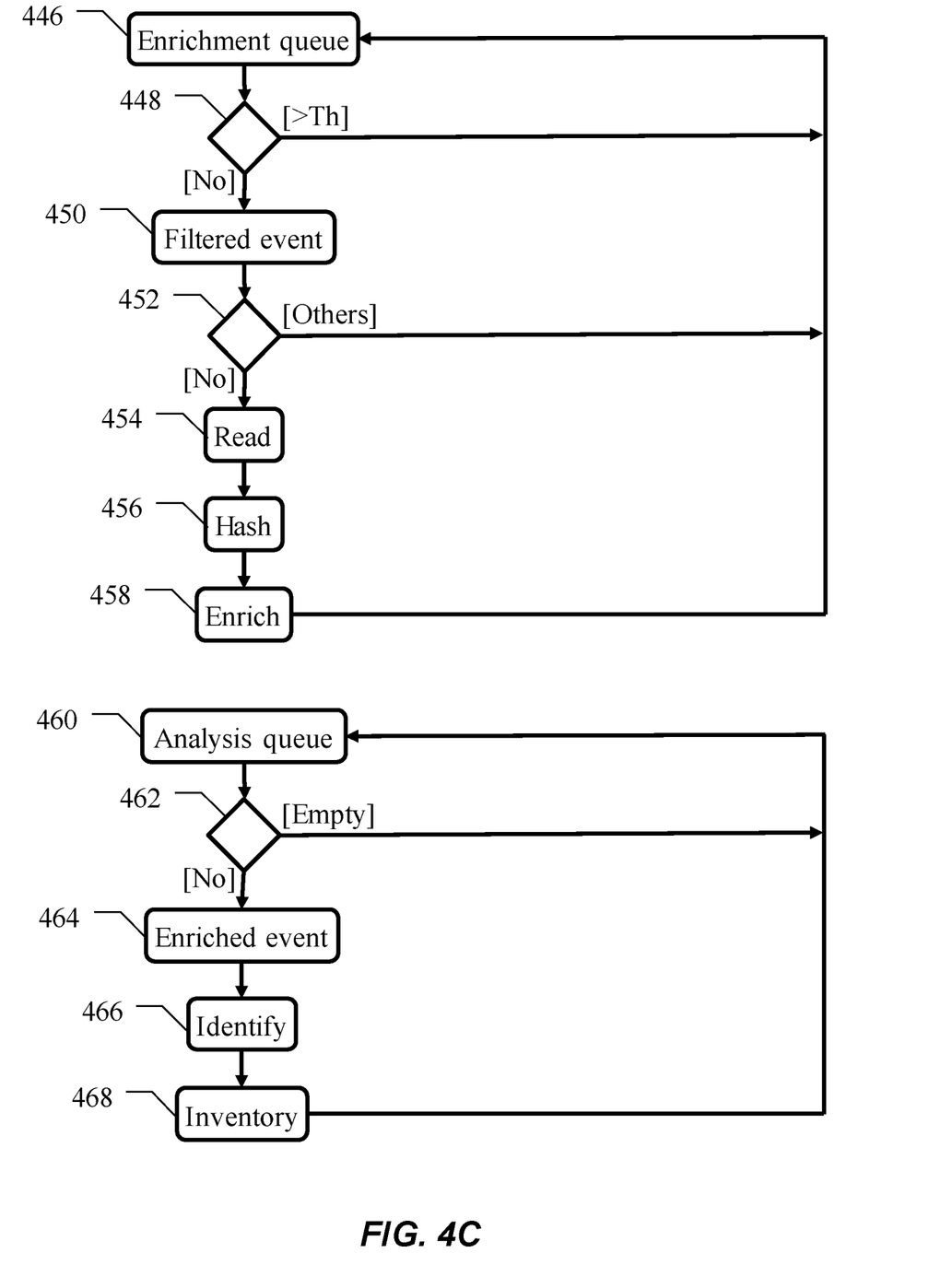

With reference now to FIG. 4A-FIG. 4C, an activity diagram is shown describing the flow of activities relating to an implementation of the solution according to an embodiment of the present disclosure.

Particularly, the diagram represents an exemplary process that may be used to identify the files of a generic endpoint with a method 400. In this respect, each block may correspond to one or more executable instructions for implementing the specified logical function on the endpoint.

Starting from the monitor, a loop is performed continually for monitoring and filtering the events (relating to the files of the endpoint). Particularly, at block 402 the monitor verifies the monitoring queue. The process then branches at block 404 according to a result of this verification. If the monitoring queue is empty, the flow of activity returns to the block 402 in an idle loop. Conversely, the flow of activity descends into block 406, wherein the monitor extracts a (current) event from the monitoring queue, i.e., the oldest one from its head; at the same time, the monitor may also log the current event, for example, for diagnostic purposes.

Continuing to block 408, the monitor verifies whether the current event is a modify event, which indicates the closing of the corresponding (current) file after it has been modified. If so, at block 410 the monitor verifies whether the filtering queue contains any other events of the current file (according to its name and path indicated in the current event). If not, at block 412 the monitor adds the current event to the filtering queue (at its tail). Conversely, at block 414 the monitor verifies whether a difference between the timestamp of the current event and the timestamp of a last (i.e., oldest) event of the current file in the filtering queue is (possibly strictly) higher than a monitoring threshold (for example, 3-5 [s]). If not, as above the monitor adds the current event to the filtering queue at the block 412. Conversely, at block 416 the monitor adds this last event to the enrichment queue (at its tail). Moreover, at block 418 the monitor removes all the events of the current file from the filtering queue. As above, the monitor then adds the current event to the filtering queue at the block 412. In any case, the flow of activity returns from the block 412 to the block 402 to perform the same operations continually.

In this way, when a modify sequence is found (consisting of an event sequence of multiple modify events of a same file that are separated among them by a period shorter than the monitoring threshold), its modify events are filtered to maintain the last modify event only; indeed, in this case the file has been modified in rapid succession (for example, during its editing), so that only its content at the end is relevant. This further reduces the calculations of the hashes of the files, and then the overhead of the endpoint.

Referring back to the block 408, if the current event is not a modify event the process descends into block 420; at this point, the monitor verifies whether the current event is a create event, which indicates the creation of the current file (empty or with minimum size). If so, at block 422 the monitor verifies whether the filtering queue contains any other events of the current file (for one or more modify events in rapid succession in the light of above). If not, at block 424 the monitor adds the current event to the filtering queue. Conversely, at block 426 the monitor adds a last event of the current file in the filtering queue to the enrichment queue. Moreover, at block 428 the monitor removes all the events of the current file from the filtering queue. As above, the monitor then adds the current event to the filtering queue at the block 424. In any case, the flow of activity returns from the block 424 to the block 402 to perform the same operations continually.

In view of the above, the modify sequence may also be defined by the create event followed by one or more modify events that are separated among them by a period shorter than the monitoring threshold (which modify sequence is filtered as above to maintain the last modify event only); indeed, in this case as well the file has been modified in rapid succession during its creation (so that only its content at the end is relevant).

Referring back to the block 420, if the current event is not a create event the process descends into block 430; at this point, the monitor verifies whether the current event is a rename event, which indicates the renaming of the current file, or a delete event, which indicates the deletion of the current file. If so (rename/delete event), at block 432 the monitor verifies whether the filtering queue contains any other events of the current file (consisting of the create event and/or one or more modify events in rapid succession in the light of above). If not, at block 434 the monitor adds the current event to the enrichment queue. Conversely, at block 436 the monitor adds a last event of the current file in the filtering queue to the enrichment queue. Moreover, at block 438 the monitor removes all the events of the current file from the filtering queue. As above, the monitor then adds the current event to the enrichment queue at the block 434. In any case, the flow of activity returns from the block 434 to the block 402 to perform the same operations continually.

In this way, any preceding modify sequence (formed by a create event and one or more modify events or by two or more modify events in rapid succession) is processed by adding its last event to the enrichment queue before adding the current event (rename/delete event) thereto directly.

Referring back to the block 430, if the current event is neither a rename event nor a create event the process descends into block 440; in this case, the current event (being different from a modify/create/rename/delete event) is not relevant so that it is discarded (without performing any action). The monitor now verifies whether a last event at the head of the filtering queue, i.e., the oldest one (consisting of a create/modify event for any file in the light of above) has its timestamp that is (possibly strictly) older than the monitoring threshold from the current time. If so, at block 442 the monitor adds this last event to the enrichment queue. Moreover, at block 444 the monitor removes all the events of the same file of this last event from the filtering queue. The flow of activity then returns from the block 444 or directly from the block 440 (if the timestamp of the last event is not older than the monitoring threshold) to the block 402 to perform the same operations continually.

In this way, any modify sequence (formed by a create event and one or more modify events or by two or more modify events in rapid succession) is processed by adding its last event to the enrichment queue when the monitoring threshold has lapsed without any further event (for a modify/create/rename/delete event) of the same file.

At the same time, the enricher continually performs a loop for enriching the filtered events. Particularly, at block 446 the enricher verifies the enrichment queue. The process then branches at block 448 according to a result of this verification. If the enrichment queue is empty or the timestamp of a (current) filtered event at its head, i.e., the oldest one, is not (possibly strictly) older than an enrichment threshold from the current time (for example, 5-10 [s]) the flow of activity returns to the block 446 in an idle loop. Conversely, when the timestamp of the current filtered event is older than the enrichment threshold, at block 450 the enricher extracts the current event from the enrichment queue. Continuing to block 452, the enricher verifies whether the enrichment queue contains any (next) filtered event of the (current) file of the current filtered event (according to its name and path indicated therein), i.e., a newer one; if so, the enricher further verifies whether the difference between the timestamp of the next filtered event and the timestamp of the current filtered event is (possibly strictly) higher than the enrichment threshold. If not, the flow of activity returns to the block 446 directly as well (so that the current event is discarded).

In this way, when a filtered event sequence is found of two or more filtered events (of any type) for the same file separated among them by periods shorter than the enrichment threshold, the corresponding filtered events are further filtered to maintain the last filtered event only; indeed, in this case different operations have been performed on the file in rapid succession (for example, when the file is copied and then modified), so that only its content at the end is relevant. This still further reduces the calculations of the hashes of the files, and then the overhead of the endpoint.

Referring back to the block 452, if the enrichment queue does not contain any next filtered event of the current file or the difference between the timestamp of the next filtered event and the timestamp of the current filtered event is higher than the enrichment threshold the process descends into block 454; at this point, the enricher reads the current file (by loading it into the working memory of the endpoint). Passing to block 456, the enricher calculates one or more hashes of the current file (of all the types indicated in the software catalogue). The reading of the current file in advance (only once) significantly reduces the time required to calculate multiple hashes (further reducing the overhead of the endpoint). The enricher then enriches the current filtered event accordingly at block 458; particularly, the enricher adds the hashes so calculated and the size of the current file (retrieved from the operating system) and adds the enriched event so obtained to the identification queue. The flow of activity then returns to the block 446 to perform the same operations continually.

At the same time, the identifier continually performs a loop for identifying the files (of the enriched events). Particularly, at block 460 the identifier verifies the identification queue. The process then branches at block 462 according to a result of this verification. If the identification queue is empty the flow of activity returns to the block 460 in an idle loop. Conversely, the flow of activity descends into block 464, wherein the identifier extracts a (current) enriched event from the identification queue, i.e., the oldest one from its head. Continuing to block 466, the identifier attempts to identify the (current) file of the current enriched event. For this purpose, the identifier verifies each hash of the current file against the known hashes of the same types in the software catalogue. If a match is found, the current file is identified accordingly (otherwise, it remains unknown). The identifier then updates the software inventory for the current file at block 468. Particularly, the identifier adds a new record when the current file has been created, modifies its record when the current file has been modified/renamed or remove its record when the current file has been deleted; the (new/modified) record comprises the identifier of the current file (or a null value when it is unknown), its name, path and size (retrieved from the enriched event). The software inventory may be uploaded (for example, periodically or at any change thereof) to the management server for use by the resource management application. For example, the resource management application may aggregate the software inventories from all the endpoints into a (global) software report, for example, indicating all the legitimate software programs, unauthorized software programs or malwares. The software report may be used for analysis and/or remediation purposes. For example, the system administrator may be informed of any non-compliance with applicable license conditions so as to act accordingly (for example, by provisioning additional entitlements). Moreover, the resource management application may deploy management policies to the endpoints for their application thereon; each management policy indicates one or more management actions that have to be executed on the endpoints to make them compliant therewith (for example, removing unauthorized software programs, removing or moving to quarantine malwares). In any case, the flow of activity returns to the block 460 to perform the same operations continually.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for identifying software components in a computing system. However, the software components may be of any type (for example, executable programs, plug-ins, libraries, macros, configurations) in any computing system (see below); moreover, the method may be performed at any time (for example, continually, periodically).

In an embodiment, the method comprises monitoring events relating to one or more software components of the computing system. However, the events may be monitored in any way (for example, with listening, intercepting, hooking techniques) for any number of software components (for example, indiscriminately or only for selected types, such as executable programs); moreover, the events may be of any type (for example, create, modify, rename, delete, open, close, write, read, load, execute) and issued by any entity (for example, the operating system, a middleware, an application program).

In an embodiment, the method comprises filtering the events into filtered events. However, the events may be filtered in any way (for example, by discarding all the events different from the finalizing events, discarding finalizing events relating to a same software component that are in short succession, maintaining the events that are not part of any event sequences).

In an embodiment, the events are filtered according to finalizing events of corresponding event sequences ending with the finalizing events. However, the event sequences may be detected in any way (for example, by storing the events temporarily into one or more filtering queues, analyzing them directly as they are received, such as by discarding specific types thereof indiscriminately).

In an embodiment, each of the event sequences relates to a logical operation for a corresponding current software component of the software component that is finalized by the corresponding finalizing event. However, the event sequences may relate to any logical operations (for example, modify, create, rename, delete); moreover, the event sequences may have any length and they may be identified by any finalizing events (for example, when a file is closed, a predefined period passed without any further operation on a file).

In an embodiment, the method comprises determining corresponding current signatures of the current software components of the filtered events. However, each current signature may be formed by any number of items each one of any type (for example, hash values, fingerprints, checksums).

In an embodiment, each of the current signatures is determined according to at least part of a content of the corresponding current software component. However, the current signature may be determined according to any part of the content of the corresponding current software component (for example, all its content, a single segment thereof, two of more non-contiguous segments identified in any way, such as by wildcards, fixed positions).

In an embodiment, the current signature is for use to identify the current software component. However, the current software components may be identified in any way (for example, by their product name, version, service level, publisher, mnemonic description, product code or any combination thereof). This information may be used for any purpose (for example, for inventorying legitimate software programs, discovering unauthorized software programs, detecting malwares, analyzing deviations such as caused by a same file with different size on some endpoints or any combination thereof); particularly, the information may be used either for reporting only or for performing corresponding management activities as well (for example, by removing files, moving files to quarantine, applying patches) in any way (for example, by deploying policies for the management activities, enforcing the management activities directly).

In an embodiment, the current software component is identified according to a comparison of the current signature with one or more known signatures of known software components. However, the kwon signatures may be provided in any way (for example, in one or more catalogues, blacklists, databases) for any known software components (for example, legitimate software programs, unauthorized software programs, malwares); moreover, the operation of identifying the current software components may be performed according to any comparison of their current signatures with the known signatures (for example, by exact matches only, inexact matches as well) and at any location (for example, locally on each endpoint or centrally in a server that receives the current signatures from each endpoint).

In an embodiment, the method comprises determining the current signatures for use to generate inventory information of the software components of the computing system. However, the inventory information may be used for any purpose (for example, to ensure compliance with applicable license conditions, correct maintenance).

In an embodiment, the method comprises determining the current signatures for use to detect undesired software components in the computing system. However, the undesired software components may be of any type (for example, any unauthorized software programs such as games, social networks, peer-to-peer applications, programs for private use only, freewares, sharewares and/or any malwares such as viruses, worms, trojan horses, ransomwares, spywares, adwares).

In an embodiment, said step of determining corresponding current signatures comprises calculating one or more hash values of said at least part of the content of each of the current software components. However, the hash values may be in any number and of any type (for example, cryptographic hash values such as SHA, MD5, RIPEMD, simple hash values being invertible).

In an embodiment, said step of calculating one or more hash values comprises reading said at least part of the content of the corresponding current software component once for a plurality of the hash values of the current software component. However, the content of the current software component (or its part) may be read in any way (for example, at the level of any blocks thereof); in any case, the possibility is not excluded of reading the current software component repeatedly for its hash values (for example, when their calculation is relatively simple).

In an embodiment, said step of calculating one or more hash values comprises calculating the hash values of the corresponding current software component from said at least part of the content thereof being read. However, any number of hash values may be calculated from the single reading of the current software component.

In an embodiment, said step of filtering the events comprises detecting one or more of the event sequences with the corresponding finalizing events that are modify events indicative of a closing of the corresponding current software components that have been modified. However, the modify event may be of any type (for example, the closing after opening in write mode, after writing one or more blocks).

In an embodiment, said step of filtering the events comprises detecting one or more modify sequences of the event sequences, with each of the modify sequences comprising a create event (indicative of a creation of the corresponding current software component) and/or one or more of the modify events of the corresponding current software component that are separated by corresponding periods shorter than a monitoring threshold. However, each modify sequence may comprise the create event and one or more modify events, two or more modify events (in any number), with the create/modify events that are separated by periods shorter than any monitoring threshold (for example, static or dynamic).

In an embodiment, said step of filtering the events comprises detecting one or more of the event sequences with the corresponding finalizing events that are rename events (indicative of a renaming of the corresponding current software component) and/or delete events (indicative of a deletion of the corresponding current software component). However, the event sequences may be detected for different, alternative or additional events.

In an embodiment, said step of monitoring events comprises monitoring the events by operating in a user mode of the computing system (with privileges reduced with respect to a maximum level thereof). However, the events may be monitored by operating at any level of (limited) privileges; in any case, the possibility is not excluded of operating at the maximum level of privileges (for example, in kernel/master/supervisor mode).

In an embodiment, the method comprises monitoring the events by consuming the events from a monitoring queue produced by an operating system of the computing system. However, the events may comprise any information (sufficient to identify them) and they may be produced/consumed by any entities with a monitoring queue of any length; in any case, the corresponding synchronization may be implemented in any way (for example, with a FIFO queue, a channel, semaphores, monitors).

In an embodiment, the method comprises producing an enrichment queue with the filtered events. However, the filtered events may be of any type (either the same or different with respect to the corresponding events as monitored) and they may be produced by any entity with an enrichment queue of any length.

In an embodiment, the method comprises consuming the filtered events from the enrichment queue for determining the current signatures of the corresponding current software components. However, the corresponding synchronization may be implemented in any way (either the same or different with respect to the one relating to the events to be filtered).

In an embodiment, the method comprises saving at least part of the events temporally into one or more filtering queues for filtering the events. However, the filtering queues may be in any number and of any type (for example, a common structure for all the software components or individual structures for different software components) for saving any number and types of events (for example, only modify events, modify events and create events).

In an embodiment, said step of determining the current signatures comprises filtering the filtered events according to last filtered events of any filtered event sequences of the filtered events each consisting of the filtered events of a same one of the corresponding current software components that are separated by corresponding periods shorter than an enrichment threshold. However, each filtered event sequence may comprise any number and type of filtered events that are separated by periods shorter than any enrichment threshold (for example, static or dynamic); in any case, this feature may also be omitted at all.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method. An embodiment provides a computer program product comprising a computer readable storage medium having program instructions embodied therewith, the program instructions executable by a computing system to cause the computing system to perform the same method. However, the computer program may run on any computing system (see below). Moreover, the software program may be implemented as a stand-alone module, as a plug-in for a pre-existing software program (for example, the inventory tool) or even directly in the latter. In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing the steps of the above-mentioned method. An embodiment provides a system comprising a circuitry (i.e., any hardware suitably configured, for example, by software) for performing each step of the same method. However, the method may be performed on any number and type of endpoints (for example, desktops, laptops, smartphones, tablets) that are managed by any server (for example, a physical computing machine, a virtual computing machine, a cloud service) communicating among them via any network (for example, of local, wide area, global, cellular or satellite type); in any case, the method may also be implemented on any stand-alone computing machine.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, a possible combination of the features described above may be the following: claim 2 with claim 1, claim 3 with claim 1 or 2, claim 4 with any claim from 1 to 3, claim 5 with claim 4, claim 6 with any claim from 1 to 5, claim 7 with claim 6, claim 8 with any claim from 1 to 7, claim 9 with any claim from 1 to 8, claim 10 with any claim from 1 to 9, claim 11 with claim 10, claim 12 with any claim from 1 to 11, claim 13 with instructions for performing the method of any claim from 1 to 12 and claim 14 with means (or a circuitry) for performing each step of any claim from 1 to 12.

What is claimed is:

1. A method for identifying software components in a computing system, wherein the method comprises:
   monitoring an event sequence relating to one or more software components of the computing system;
   filtering the event sequence into a filtering queue of filtered events by maintaining finalizing event of the event sequence ending with the finalizing event, each of the filtered events relating to a logical operation for a current software component of the software components being finalized by the finalizing event;

determining, from the filtering queue, current signatures of the current software components, each of the current signatures being determined according to at least part of a content of the current software component for use to identify the current software component according to a comparison of the current signature with one or more known signatures of known software components;

producing an enrichment queue with the filtered events from the filtering queue by adding to the filtered events in the enrichment queue one or more of the signatures of the current software components;

consuming the filtered events from the enrichment queue for determining the current signatures of the corresponding current software components; and based on determining a modifying sequence, wherein the modifying sequence indicates a closing of the corresponding file, adding a last event from the monitored event sequence to the enrichment queue when a monitoring threshold has lapsed.

2. The method according to claim 1, wherein the method further comprising:
determining the current signatures for use to generate inventory information of the software components of the computing system.

3. The method according to claim 1, wherein the method further comprising:
determining the current signatures for use to detect undesired software components in the computing system.

4. The method according to claim 1, wherein said determining current signatures comprises:
calculating one or more hash values of said at least part of the content of each of the current software components.

5. The method according to claim 4, wherein said calculating one or more hash values comprises:
reading said at least part of the content of the corresponding current software component once for a plurality of the hash values of the current software component; and
calculating the hash values of the corresponding current software component from said at least part of the content thereof being read.

6. The method according to claim 1, wherein said filtering the event sequence comprises:
detecting one or more of the event sequences with the finalizing event being modify events indicative of a closing of the corresponding current software components being modified.

7. The method according to claim 6, wherein said filtering the event sequence comprises:
detecting one or more modifying sequences of the event sequences, each of the modifying sequences comprising one or more selected from the group consisting of:
a create event indicative of a creation of the corresponding current software component, and
one or more of the modify events of the corresponding current software component that are separated by corresponding periods shorter than a monitoring threshold.

8. The method according to claim 1, wherein said filtering the event sequence comprises:
detecting one or more of the event sequences, with the corresponding finalizing event being one or more selected from the group consisting of:
rename events indicative of a renaming of the corresponding current software component, and
delete events indicative of a deletion of the corresponding current software component.

9. The method according to claim 1, wherein said monitoring events comprises:
monitoring the events by operating in a user mode of the computing system with privileges reduced with respect to a maximum level thereof.

10. The method according to claim 1, wherein the method further comprising:
saving at least part of the events temporally into one or more filtering queues for filtering the events.

11. The method according to claim 1, wherein said determining the current signatures comprises:
filtering the filtered events according to last filtered events of any filtered event sequences of the filtered events, each consisting of the filtered events of a same one of the corresponding current software components that are separated by corresponding periods shorter than an enrichment threshold.

12. A computer program product for identifying software components in a computing system, the computer program product comprising:
a computer readable storage medium having program instructions embodied therewith, the program instructions executable by the computing system to cause the computing system to:
monitoring an event sequence relating to one or more software components of the computing system;
filtering the event sequence into a filtering queue of filtered events by maintaining finalizing event of the event sequence ending with the finalizing event, each of the filtered events relating to a logical operation for a current software component of the software components being finalized by the finalizing event;
determining, from the filtering queue, current signatures of the current software components, each of the current signatures being determined according to at least part of a content of the current software component for use to identify the current software component according to a comparison of the current signature with one or more known signatures of known software components;
producing an enrichment queue with the filtered events from the filtering queue by adding to the filtered events in the enrichment queue one or more of the signatures of the current software components;
consuming the filtered events from the enrichment queue for determining the current signatures of the corresponding current software components; and
based on determining a modifying sequence, wherein the modifying sequence indicates a closing of the corresponding file, adding a last event from the monitored event sequence to the enrichment queue when a monitoring threshold has lapsed.

13. The computer program product according to claim 12, further comprising:
determine the current signatures for use to generate inventory information of the software components of the computing system.

14. The computer program product according to claim 12, further comprising:
determine the current signatures for use to detect undesired software components in the computing system.

15. The computer program product according to claim 12, wherein determine current signatures comprises:
calculate one or more hash values of said at least part of the content of each of the current software components.

16. The computer program product according to claim 15, wherein calculate one or more hash values comprises:
    read at least part of the content of the corresponding current software component once for a plurality of the hash values of the current software component; and
    calculate the hash values of the corresponding current software component from said at least part of the content thereof being read.

17. The computer program product according to claim 12, wherein filter the event sequence comprises:
    detect one or more of the event sequences with the corresponding finalizing event being modify events indicative of a closing of the corresponding current software components being modified.

18. The computer program product according to claim 17, wherein filter the event sequence comprises:
    detect one or more modifying sequences of the event sequences, each of the modifying sequences comprising one or more selected from the group consisting of:
        a create event indicative of a creation of the corresponding current software component, and
        one or more of the modify events of the corresponding current software component that are separated by corresponding periods shorter than a monitoring threshold.

19. A computer system for identifying software components in a computing system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    monitoring an event sequence relating to one or more software components of the computing system;
    filtering the event sequence into a filtering queue of filtered events by maintaining finalizing event of the event sequence ending with the finalizing event, each of the filtered events relating to a logical operation for a current software component of the software components being finalized by the finalizing event;
    determining, from the filtering queue, current signatures of the current software components, each of the current signatures being determined according to at least part of a content of the current software component for use to identify the current software component according to a comparison of the current signature with one or more known signatures of known software components;
    producing an enrichment queue with the filtered events from the filtering queue by adding to the filtered events in the enrichment queue one or more of the signatures of the current software components;
    consuming the filtered events from the enrichment queue for determining the current signatures of the corresponding current software components; and
    based on determining a modifying sequence, wherein the modifying sequence indicates a closing of the corresponding file, adding a last event from the monitored event sequence to the enrichment queue when a monitoring threshold has lapsed.

* * * * *